United States Patent [19]

Bonnke et al.

[11] Patent Number: 4,649,171
[45] Date of Patent: Mar. 10, 1987

[54] POLYOLEFIN MOLDING COMPOSITION

[75] Inventors: Martin Bonnke, Hattersheim am Main; Lothar Bothe, Mainz, both of Fed. Rep. of Germany

[73] Assignee: Hoechst Aktiengesellschaft, Frankfurt am Main, Fed. Rep. of Germany

[21] Appl. No.: 751,070

[22] Filed: Jul. 2, 1985

[30] Foreign Application Priority Data

Jul. 5, 1984 [DE] Fed. Rep. of Germany ....... 3424695

[51] Int. Cl.$^4$ .......................... C08K 5/05; C08K 5/09; C08L 23/12
[52] U.S. Cl. ..................................... 524/381; 524/583
[58] Field of Search ......................................... 524/381

[56] References Cited

U.S. PATENT DOCUMENTS

| | | | |
|---|---|---|---|
| 3,527,730 | 9/1970 | Coulson et al. | 524/381 |
| 3,907,749 | 9/1975 | Friedrich et al. | 524/381 |
| 4,104,247 | 8/1978 | Kato et al. | 524/381 |

FOREIGN PATENT DOCUMENTS

| | | | |
|---|---|---|---|
| 3206137 | 9/1983 | Fed. Rep. of Germany . | |
| 56-120740 | 9/1981 | Japan | 524/381 |

*Primary Examiner*—Wilbert J. Briggs, Sr.
*Attorney, Agent, or Firm*—Connolly and Hutz

[57] ABSTRACT

A polyolefin molding composition which contains a very small amount of a metal salt of citric acid brings about only very slight corrosion to the machines during processing.

5 Claims, No Drawings

POLYOLEFIN MOLDING COMPOSITION

The invention relates to a polyolefin molding composition which brings about less corrosion to the machines during processing.

During the processing of polyolefin molding compositions to give molded articles, corrosion of the metal parts which come into contact with the hot molding composition is a frequent occurrence. Thus, there have been no lack of attempts to eliminate this deficiency.

The addition of metal stearates such as, for example, calcium stearate, or magnesium oxide, to molding compositions of this type to reduce the corrosion to the processing machines is known. However, magnesium oxide adversely affects the color quality of the molded articles, and when calcium stearate is used there are undesired deposits on the machine parts and/or the occurrence of vapors.

It is also known to use salts of citric acid as nucleating agents in polyolefin molding compositions which readily crystallize (see German Offenlegungsschrift No. 3,206,137). The amount of the salt is 0.05 to 0.8% by weight based on the polyolefin.

It has now been found that a polyolefin molding composition which contains a very small amount of a metal salt of citric acid brings about less corrosion to the machines.

Thus the invention relates to a polyolefin molding composition composed of a homopolymer or copolymer of a 1-olefin having 2 to 10 carbon atoms, 0.01 to 0.045% by weight, based on the polymer, of a metal salt of citric acid, and, where appropriate, other, customary, auxiliaries and additives in customary amounts.

The basic polymers suitable for the polyolefin molding composition according to the invention are homopolymers or copolymers of 1-olefins having 2 to 10 carbon atoms, for example of ethylene, propylene, 1-butene and 4-methyl-1-pentene. Thus, polyethylene, polypropylene, poly-1-butene, poly-4-methyl-1-pentene, ethylene/propylene copolymers, ethylene/butene copolymers and the like, as well as mixtures of these polymers, are suitable.

The metal salt of citric acid is a salt of the alkali metals, of the alkaline earth metals, or of the earth metals, for example sodium, potassium, lithium, calcium, magnesium or aluminum. Salts of the alkali and alkaline earth metals are preferably used, in particular the citrates of potassium and sodium. The amount is 0.01 to 0.045% by weight, in each case based on the polyolefin.

The citrates are advantageously used in a finely divided form. Their particle size is preferably less than 30 μm.

The molding composition according to the invention can contain the customary additives which facilitate processing and improve the physical properties. Those which should be mentioned are stabilizers against light and heat, antioxidants, antistatics and lubricants, as well as fillers, coloring pigments and flameproofing agents. The first group is generally contained in the molding composition in an amount of 0.1 to 5% by weight, calculated on the amount of polymer (plus filler). Fillers, coloring pigments and flameproofing agents are used in an amount appropriate for the requirements.

The incorporation of the metal salt of citric acid into the polyolefin is carried out in a known manner, for example using mixers, extruders, roller mills or kneaders. It is also possible, where appropriate, for the mixing in to be carried out by spraying on a solution.

EXAMPLE 1

In each case, one propylene homopolymer (R-1; MFI 5/230=10 g/10 min) and one propylene/ethylene block copolymer (R-2; 8% ethylene, MFI 5/230=1 g/10 min) were mixed with increasing amounts of tripotassium citrate and subjected to a corrosion test. For comparison, molding compositions each containing the same amount of calcium stearate were prepared.

For this purpose, 2 iron platelets 0.2 mm thick were introduced into the samples of molding composition in such a manner that they were surrounded as uniformly as possible by the powder or granules. For this purpose, about one half of the amount of material weighed out (6 g) was packed into the recesses (diameter 50 mm) of a 4 mm spacer frame, and the platelets were laid next to one another using tweezers in such a manner that they touched neither one another nor the frame. The iron platelets were about 20 mm long and were stored in acetone after they had been degreased by rubbing off with acetone. Before the introduction, the acetone was to be removed using a soft cloth. The iron platelets should not be touched with the fingers.

The spacer frame and the covering sheet (aluminum foil) were placed in the press heated to 250° C. and, after 5 min contact pressure, were compressed under a pressure of 100 gauge atmospheres for 1 h. Previously, the 0.5 mm thick aluminum foil which was introduced between the cover plate and the spacer frame had been rubbed with vaseline in order to reduce the tenacity of adhesion of the product to the aluminum foil.

The press was then immediately cooled. The iron platelets are required still to lie next to one another and may not project out of the plate. They were punched out of the plate, perforated and weighed accurate to 1/10 mg. Of course, it was not permissible to touch them by hand. They were then suspended in a row on a copper wire in the stream of steam from boiling water. A sieve was placed above the surface of the water to prevent water droplets being deposited on the sheets. After 1 h, the iron platelets were removed, stored at room temperature for 1 h, and then weighed again. The increase in weight in % is the corrosion value, which is listed in Table 1.

TABLE 1

| Results of the corrosion tests | | |
|---|---|---|
| Raw material + tripotassium citrate or calcium stearate | Corrosion value in % Tripotassium citrate | Calcium stearate |
| R-1 | 0.22 | 0.22 |
| R-1 + 0.01% | 0.02 | 0.19 |
| R-1 + 0.03% | 0.02 | 0.11 |
| R-1 + 0.05% | 0.02 | 0.07 |
| R-1 + 0.3% | 0.02 | 0.04 |
| R-1 + 0.5% | 0.02 | 0.03 |
| R-2 | 0.54 | 0.54 |
| R-2 + 0.01% | 0.05 | 0.52 |
| R-2 + 0.03% | 0.02 | 0.45 |
| R-2 + 0.05% | 0.02 | 0.40 |
| R-2 + 0.3% | 0.02 | 0.11 |
| R-2 + 0.5% | 0.02 | 0.10 |

EXAMPLE 2

The nucleating effect of tripotassium citrate on the molding compositions of Example 1 was investigated by differential thermal analysis (DTA). The results are compiled in Table 2.

TABLE 2

| Raw material + tripotassium citrate or calcium stearate | DTA measurements | |
|---|---|---|
| | Recrystallization temperature in °C. | |
| | Tripotassium citrate | Calcium stearate |
| R-1 | 129 | 129 |
| R-1 + 0.01% | 130 | 131 |
| R-1 + 0.03% | 130 | 131 |
| R-1 + 0.05% | 129 | 131 |
| R-1 + 0.3% | 132 | 133 |
| R-1 + 0.5% | 133 | 130 |
| R-2 | 128 | 128 |
| R-2 + 0.01% | 129 | 127 |
| R-2 + 0.03% | 128 | 125 |
| R-2 + 0.05% | 128 | 127 |
| R-2 + 0.3% | 128 | 128 |
| R-2 + 0.5% | 127 | 130 |

As is evident from the table, tripotassium citrate in the concentration range according to the invention shows no nucleating effect on the polyolefins.

We claim:

1. A polyolefin molding composition, consisting essentially of a propylene homopolymer, and 0.01 to 0.045% by weight, based on the polymer, of a potassium or sodium salt of citric acid.

2. A polyolefin molding composition as claimed in claim 1, wherein the potassium or sodium salt of citric acid has a particle size of less than 30 μm.

3. A polyolefin molding composition as claimed in claim 1, containing auxiliaries and additives in effective amounts.

4. A polyolefin molding composition as claimed in claim 1, wherein the molding composition contains auxiliaries and additives which, in the amounts used, do not affect the color quality of articles molded from the molding composition, do not leave undesired deposits on parts of machines used to process the molding composition, and do not give off vapors during the processing.

5. A process for reduction of the corrosion to machines during the processing of homopolymers of propylene which consisting essentially of admixture to the polymers of 0.01 to 0.045% by weight, based on the homopolymer, of a potassium or sodium salt of citric acid.

* * * * *